US006430799B1

(12) United States Patent
Ballard et al.

(10) Patent No.: US 6,430,799 B1
(45) Date of Patent: Aug. 13, 2002

(54) METHOD FOR CONSTRUCTING A ONE-PIECE BULBSHIELD

(75) Inventors: Neil Ballard, Framingham; Paul Gary Mounter, North Reading, both of MA (US); David Chasse, Holbrook, NY (US); Boris Ioselevich, Winchester; Howard N. Wieland, Holliston, both of MA (US)

(73) Assignee: American Engineered Components, Inc., Brighton, MA (US)

( * ) Notice: Subject to any disclaimer, the term of this patent is extended or adjusted under 35 U.S.C. 154(b) by 0 days.

(21) Appl. No.: 09/495,110

(22) Filed: Feb. 1, 2000

(51) Int. Cl.[7] .................................... B23P 17/00

(52) U.S. Cl. .................... 29/413; 29/417; 72/337

(58) Field of Search .................... 29/417, 412, 413, 29/33 Q, 33 S, 33 R; 72/334, 337, 442; 362/548, 519, 475

(56) References Cited

U.S. PATENT DOCUMENTS 3,107,566 A * 10/1963 Archer .................... 29/417
3,531,861 A * 10/1970 Golbeck et al. .............. 29/622
3,739,623 A * 6/1973 Kramer .................... 72/339
3,815,198 A * 6/1974 Thalenfeld .................. 29/417
4,360,959 A * 11/1982 Johannesen .................. 29/417
5,271,140 A * 12/1993 Futamura et al. ............. 72/442
5,491,881 A * 2/1996 Collins .................... 29/417
5,603,153 A * 2/1997 Zmyslowski .................. 29/417
5,630,266 A * 5/1997 Bauer .................... 29/417
6,109,773 A * 8/2000 Nace .................... 362/548

* cited by examiner

*Primary Examiner*—S. Thomas Hughes
*Assistant Examiner*—Marc Jimenez
(74) *Attorney, Agent, or Firm*—Kriegsman & Kriegsman

(57) ABSTRACT

A one-piece bulbshield is sized and shaped to be disposed into a preformed opening in a reflector of an automotive headlamp. The one-piece bulbshield includes a cup having a defined edge scroll and a pair of legs integrally formed onto the cup, each leg having a flexible, spring engagement foot. A method for manufacturing the one-piece bulbshield from a sheet metal strip using a progressive die press includes the steps of forming a primary outline of the legs and the cup of the bulbshield in the sheet metal strip. The primary outline of the cup of the bulbshield is then drawn. Having drawn the bulbshield, a final outline of the legs is formed into the primary outline of the legs of the bulbshield. The final outline of the legs of the bulbshield is then shaped. The defined edge scroll is then formed into the primary outline of the cup to yield a finished one-piece bulbshield which, in turn, is severed from the remainder of the sheet metal strip.

5 Claims, 4 Drawing Sheets

METHOD FOR CONSTRUCTING A ONE-PIECE BULBSHIELD

BACKGROUND OF THE INVENTION

The present invention relates generally to the automotive industry and more particularly to bulbshields for automotive headlights.

Automotive headlights are well known and commonly used in the art.

Automotive headlights typically comprise a highly polished reflector which is shaped to include a plurality of preformed openings, a low-beam lightbulb which is disposed through one preformed opening in the reflector and a high-beam lightbulb which is disposed through another preformed opening in the reflector. The reflector, the low-beam lightbulb and the high-beam lightbulb are commonly enclosed by a tightly sealed, protective lens cover.

It has been found that, when illuminated, the low-beam lightbulb of an automotive headlight can produce a significant level of glare. This high level of glare produced by an illuminated low-beam lightbulb can seriously impair the ability of other drivers and passerbys to see effectively, thereby creating a very dangerous condition. As a result, the automotive industry has established safety standards for limiting the amount of glare which may be produced by an automotive headlight.

Bulbshields are well known in the art and are commonly mounted over the low-beam lightbulb of an automotive headlamp to reduce the level of glare produced by the lightbulb when illuminated.

Bulbshields typically comprise a cup and a pair of legs mounted onto the cup. The cup includes an interior surface, an exterior surface and an edge scroll formed along its open end in a particular configuration. The interior surface of the cup is typically coated with a light absorbent material, such as black paint. The exterior surface and the edge scroll of the cup are typically chrome-plated and polished so as to be highly light reflective.

In use, bulbshields serve to adequately shield other drivers from direct light produced by low-beam lightbulbs. Specifically, a bulbshield is partially disposed over a low-beam lightbulb. With the bulbshield positioned as such, some of the direct light produced by the lightbulb is absorbed by the interior surface of the cup. The remainder of the direct light produced by the lightbulb is directed onto the edge scroll of the cup. The light directed onto the edge scroll is reflected back onto the reflector of the headlamp which, in turn, is reflected forward and out the headlamp. As can be appreciated, the reflection of the light produced by the low-beam headlight creates a duller projection of light which complies with industry glare standards.

Bulbshields are typically manufactured from multiple pieces of metal which are cut and shaped at different operating stations. Specifically, the cup and the pair of legs of each bulbshield are manufactured separately using two separate primary press operations and two different types of material. Upon completion of the individual parts, in an additional assembly operation, a production worker is required to mechanically attach each of the legs onto the cup, such as by spot welding or rivoting.

Upon completion of manufacturing, the finished bulbshield is mounted onto the reflector of the automotive headlamp using different attachment techniques. For example, one type of bulbshield which is well known in the art is constructed to include a leg which is adapted to be screwed onto a tab formed on the reflector. As another example, another type of bulbshield which is well known in the art is constructed to include a plurality of rigid saw-teeth, or ratchets, formed onto each of the legs. As such, the legs of the bulbshield can be disposed into preformed openings in the reflector so that the ratchets snap-fit and engage the reflector to securely retain the bulbshield onto the reflector.

It should be noted that prior art bulbshields of the type described above often experience notable drawbacks.

As a first drawback, the attachment techniques noted above for mounting prior art bulbshields onto the reflector of the headlamp have been found, on occassion, to be inadequate. Specifically, it has been found that some types of prior art bulbshields are not adequately secured onto the reflector and, as a consequence, fail to satisfy automotive vibration standards.

As a second drawback, the manufacturing process noted above for constructing multiple piece bulbshields has been found to be time-consuming and expensive to complete. Specifically, because the manufacturing process for producing multiple piece bulbshields requires a number of separate parts, separate press operations and an assembly operation in which a production worker mechanically attaches each of the legs onto the cup, the manufacturing process is rendered time-consuming and expensive to perform.

Accordingly, one-piece bulbshields have been manufactured by American Engineered Components, Inc. of Brighton, Massachusetts using a single piece of metal and a plurality of individual tools. Specifically, in the first production step, a flat metal blank is cut using wire electrical-discharge machining (WEDM) so as to yield a primary outline of the one-piece bulbshield. In the second production step, a first drawing tool is used to perform a primary draw of the cup in the primary outline of the one-piece bulbshield. In the third production step, a second drawing tool is used to perform a secondary draw of the cup in the primary outline of the one-piece bulbshield. Having completed the draw of the cup, in the fourth production step, a laser cutting tool precisely cuts the shape of the legs and the configuration of the side scroll into the primary outline of the one-piece bulbshield so as to yield a final outline of the one-piece bulbshield. Having formed the final outline of the one-piece bulbshield, in the fifth production step, a primary leg forming tool begins shaping the legs. In the sixth production step, a secondary leg forming tool continues shaping the legs. In the seventh production step, a third leg forming tool completes the shaping of the legs so as to yield a finished one-piece bulbshield. The finished one-piece bulbshield is then chrome-plated so as to be highly light-reflective. After chrome-plating the bulbshield, the interior surface of the cup is painted black.

Although highly desirable, one-piece bulbshields manufactured in the manner described above still experience a notable drawback. Specifically, one-piece bulbshields manufactured in the manner described above still require various operating stations, each station requiring a separate operating tool and worker, thereby rending the manufacturing process relatively time-consuming and expensive to complete, which is highly undesirable.

SUMMARY OF THE INVENTION

It is an object of the present invention to provide a new and improved method for constructing a bulbshield.

It is another object of the present invention to provide a method for constructing a bulbshield which is one piece.

It is another object of the present invention to provide a method of the type described above for constructing a bulbshield which can be securely retained onto the reflector of an automotive headlight.

It is yet another object of the present invention to provide a method of the type described above for constructing a bulbshield which is inexpensive to perform.

It is still another object of the present invention to provide a method of the type described above for constructing a bulbshield using a limited number of operating tools.

Accordingly, in one embodiment of the present invention, there is provided a method for manufacturing a one-piece bulbshield from a sheet metal strip using a progressive die press, whererin the sheet metal strip is sequentially advanced through a plurality of stations in said progressive die press, said method comprising the steps of forming an outline of a bulbshield in the sheet metal strip, shaping the outline of the bulbshield to yield a finished one-piece bulbshield, and severing the finished one-piece bulbshield from the remainder of the sheet metal strip.

Additional objects, as well as features and advantages, of the present invention will be set forth in part in the description which follows, and in part will be obvious from the description or may be learned by practice of the invention. In the description, reference is made to the accompanying drawings which form a part thereof and in which is shown by way of illustration of an embodiment for practicing the invention. The embodiment will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate an embodiment of the invention and, together with the description, serve to explain the principles of the invention. In the drawings wherein like reference numerals represent like parts.

DETAILED DESCRIPTION OF A PREFERRED EMBODIMENT

Figure 1:
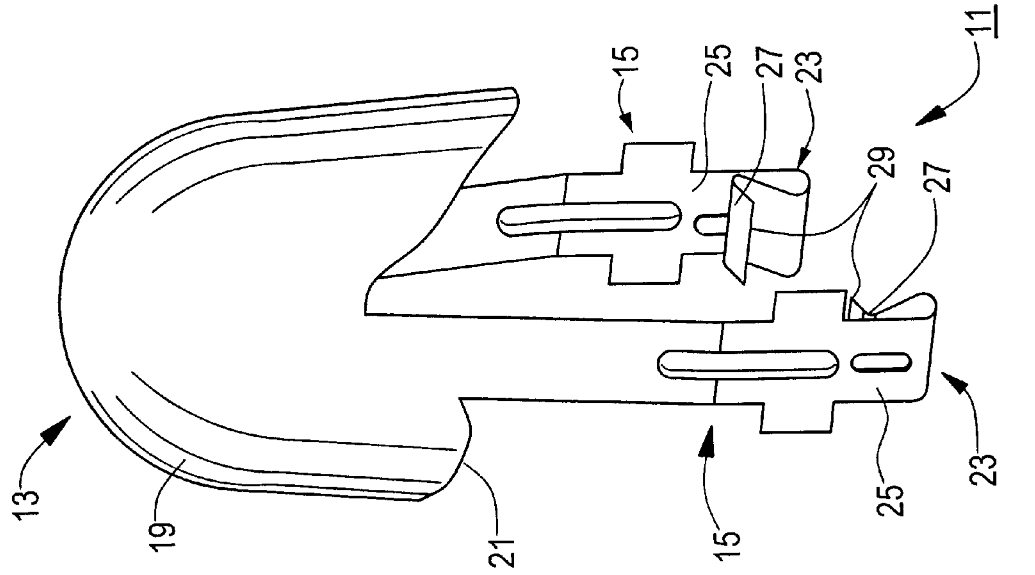
FIG. 1 is a perspective view of a one-piece bulbshield constructed according to the teachings of the present invention.
Figure 2:
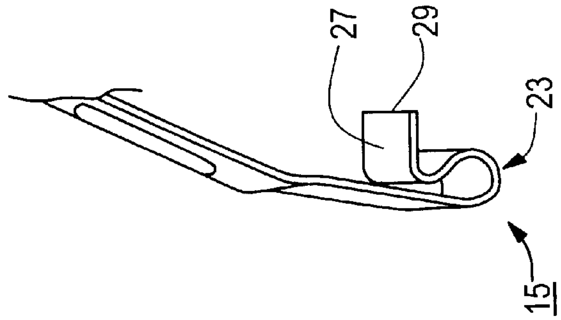
FIG. 2 is a fragmentary side view of one of the legs of the one-piece bulbshield shown in FIG. 1.
Figure 3:
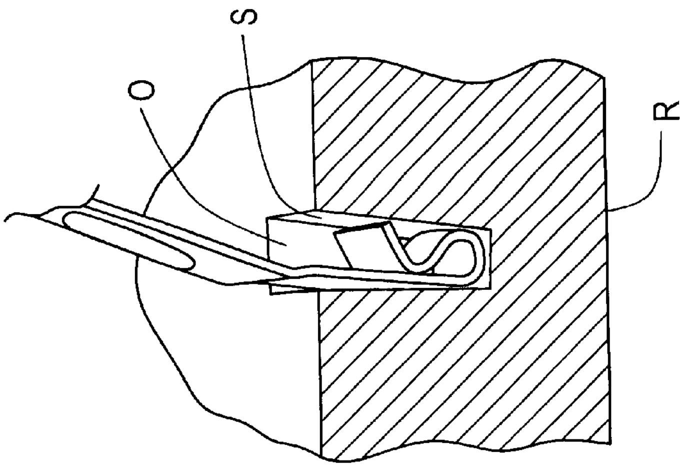
FIG. 3 is a fragmentary side view of one of the legs of the one-piece bulbshield shown in FIG. 1, the leg of the one-piece bulbshield being shown disposed within an opening in a reflector.

Referring now to FIG. 1, there is shown a perspective view of a one-piece bulbshield constructed according to the teachings of the present invention, the bulbshield being represented generally by reference numeral 11. As shown in FIG. 3, bulbshield 11 is sized and shaped to be disposed into a preformed opening O in a reflector R of an automotive headlamp, as will be described further in detail below.

Bulbshield 11 is a one-piece device comprising a cup 13 and a pair of legs 15 integrally formed onto cup 13.

Cup 13 comprises an interior surface (not shown), an exterior surface 19 and a defined edge scroll 21. The interior surface of cup 13 is preferably coated with a light absorbent material, such as black paint. Exterior surface 19 and edge scroll 21 are preferably chrome-plated and highly polished.

It should be noted that edge scroll 21 is precision cut in a particular configuration so that, in use, edge scroll 21 reflects light produced by a low-beam lightbulb back onto reflector R in a precise photometric configuration. The light propagated onto reflector R is then reflected back in the forward direction and out the automotive headlamp so as to produce light having a limited amount of glare, which is an object of the present invention.

Each leg 15 is shaped to include a flexible, spring engagement foot 23 at its free end. Engagement foot 23 is a unitary member which is shaped to include a substantially straight support member 25 and a push-in spring finger 27 which is spaced slightly apart from support member 25. Spring finger 27 is disposed to project at an approximate right angle away from straight member 25, spring finger 27 comprising a sharpened engagement tip 29.

In use, each engagement foot 23 of bulbshield 11 can be snap-fit into an associated bulbshield receiving opening 0 in reflector R. Specifically, each spring engagement foot 23 is inserted down into its associated opening O in reflector R, opening O having a sidewall S which is preferably inwardly tapered. As engagement foot 23 is inserted down into opening O, engagement tip 29 contacts sidewall S. Further insertion of engagement foot 23 down into opening O causes sidewall S to urge engagement tip 29 in a counterclockwise direction, thereby deflecting spring finger 27 slightly inward and into contact with its associated support member 25.

If an extraction, or vibration, load is applied onto legs 15 of bulbshield 11, each engagement foot 23 begins to rotate in a counterclockwise direction. Rotation of engagement foot 23 in a counterclockwise direction causes engagement tip 29 to bite into and engage sidewall S, thereby stabilizing engagement foot 23 within opening O. and precluding easy removal of bulbshield 11 from reflector R, which is highly desirable. In order to extract engagement foot 23 from opening O, engagement foot 23 would require an extraction force sufficient to enable foot 23 to cam through finger 27, finger 27 serving as the rotation center point.

As can be appreciated, the one-piece, over-center, spring action design of engagement feet 23 provides bulbshield 11 with numerous advantages over most types of prior art bulbshields. As a first advantage, the one-piece, spring action design of engagement feet 23 allows for easy, low-load installation of bulbshield 11 into reflector R. As a second advantage, the one-piece, spring action design of engagement feet 23 necessitates high-load for removal of bulbshield 11 from reflector R. As a third advantage, the one-piece, spring action design of engagement feet 23 creates a tight, stabilized, snap-fit of bulbshield 11 within reflector R, thereby placing bulbshield 11 in compliance with government vibration standards.

Figure 4:
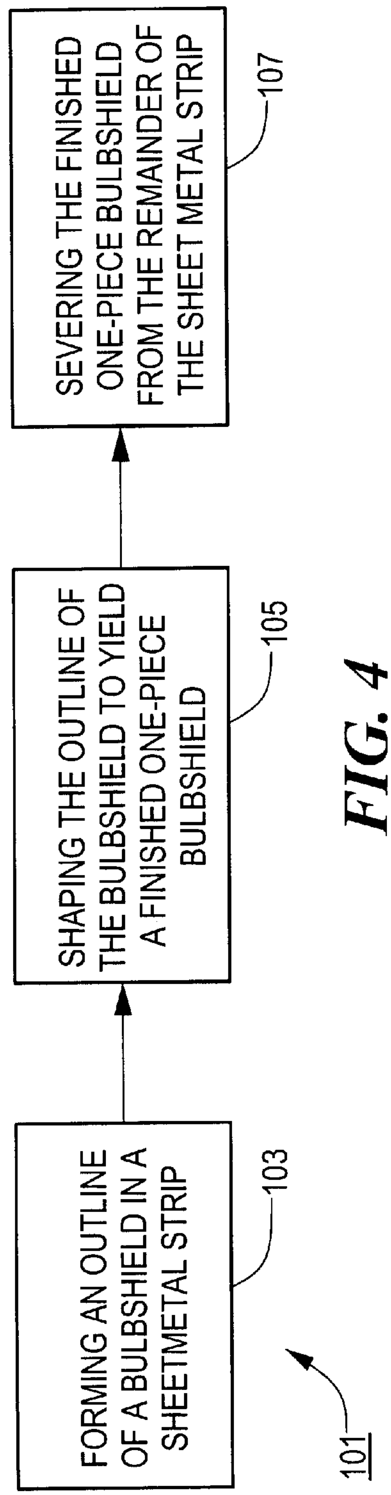
FIG. 4 is a block diagram of a method for manufacturing the bulbshield shown in FIG. 1.

Referring now to FIG. 4, there is shown a method for manufacturing a one-piece bulbshield according to the teachings of the present invention, the method being represented generally by reference numeral 101. Method 101 is described in conjunction with the manufacture of one-piece bulbshield 11; However, it is to be understood that method 101 is not limited to the manufacture of bulbshield 11. Rather, method 101 could be used to manufacture alternative types of one-piece bulbshields without departing from the spirit of the present invention.

Method 101 preferably manufactures one-piece bulbshield 11 from a sheet metal strip using a progressive die press, wherein the sheet metal strip is sequentially advanced through a plurality of stations in the progressive die press.

Method 101 comprises a primary step 103 in which an outline of bulbshield 11 is formed into the sheet metal strip. Primary step 103 is preferably accomplished through a plurality of outlining steps. Specifically, in a first outlining step, a primary, or rough, outline of legs 15 and cup 13 of bulbshield 11 is formed. In a second outlining step, a final outline of legs 15 of bulbshield 11 is formed. In a third outlining step, a final outline of cup 13 of bulbshield 11 is formed in which defined edge scroll 21 is precisely formed into cup 13.

Method 101 also comprises a secondary step 105 in which the outline of bulbshield formed in primary step 103 is shaped to yield a finished one-piece bulbshield 11. Secondary step 105 is preferably accomplished through a pair of shaping steps. Specifically, in a first shaping step, the primary outline of cup 13 is drawn into shape. In a second shaping step, the final outline of legs 15 are bent into shape. Upon completion of secondary step 105, construction of one-piece bulbshield 11 is completed with bulbshield 11 remaining connected to the remainder of the sheet metal strip.

Method 101 further comprises a tertiary step 107 in which completed, one-piece bulbshield 11 is severed from the remainder of the sheet metal strip.

Figure 5:
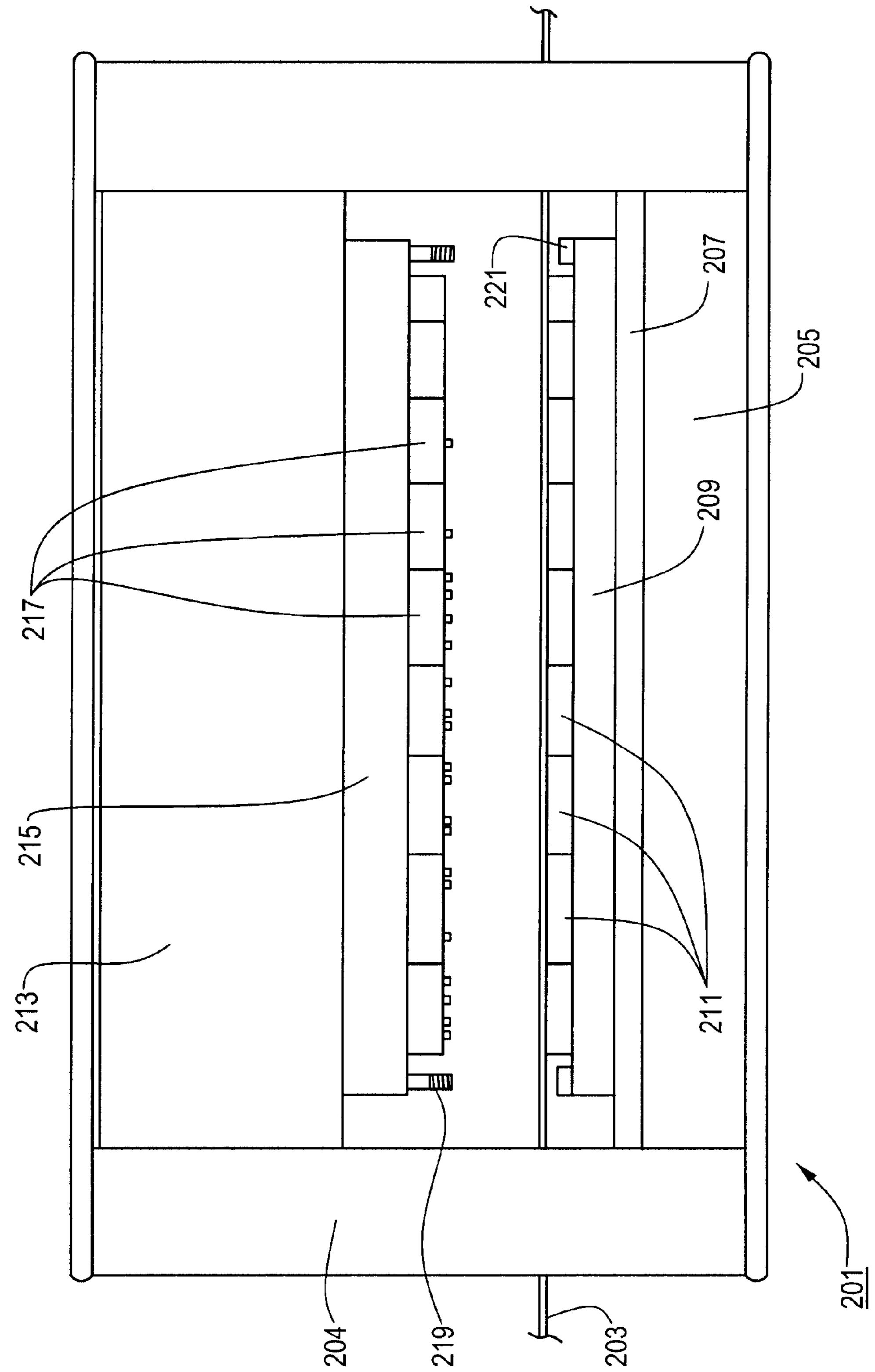
FIG. 5 is a progressive die press constructed according to the teachings of the present invention, the progressive die press being designed to perform the method of FIG. 4.

Referring now to FIG. 5, method 101 for manufacturing bulbshield 11 is preferably executed using a progressive die press constructed according to the teachings of the present invention, the progressive die press being represented generally by reference numeral 201. As will be described further in detail below, progressive die press 201 utilizes method 101 to manufacture one-piece bulbshield 11 from a sheet metal strip 203, wherein sheet metal strip 203 is sequentially advanced through a plurality of operation stations in progressive die press 201.

It should be noted that although method 101 is shown as being executed using progressive die press 201, alternative types of progressive die presses could be used to perform method 101 without departing from the spirit of the present invention.

Progressive die press 201 comprises a press frame 204 and a lower press platen 205 fixedly mounted onto press frame 204. Lower press platen 205 is a constructed of a very heavy metal and serves as a fixed support base for press 201. A bolster plate 207 is fixedly mounted onto lower press platen 205. A lower die shoe 209 is fixedly mounted onto bolster plate 207. A plurality of die blocks 211 are fixedly mounted onto lower die shoe 209.

A vertically moveable ram 213 is slidably mounted on press frame 204. An upper drive shoe 215 is fixedly mounted onto ram 213. Upper punch blocks 217, also commonly referred to simply as forming tools, are fixedly mounted onto upper drive shoe 215. Each upper punch block 217 defines as many as three different operation stations.

In use, progressive die press 201 manufactures bulbshields 11 from sheet metal strip 203 using method 101 in the following manner. Specifically, ram 213 is connected to a power source assembly (not shown) which provides the necessary power to continuously drive ram 213 up and down. As ram 213 drives up and down, a stock of sheet metal strip 203 is sequentially fed from a supply coil (not shown) into press 201 by an electronically controlled precision servo feed (not shown). Sheet metal strip 203 is fed through progressive die press 201 in intermittent movement coordinated with the strokes of ram 213 in a well-known manner. With sheet metal strip 203 being sequentially fed into press 201, ram 213 drives up and down so that upper punch blocks 217 and die blocks 211 are drawn into selective contact with one another with sheet metal strip 203 disposed therebetween. As can be appreciated, upper punch blocks 215 and die blocks 211 together define the different stations required to manufacture bulbshield 11 from sheet metal strip 203 using method 101. In this manner, every forming operation is performed through each stroke of ram 213.

It should be noted that progressive die press 201 also comprises a plurality of posts 219 fixedly mounted on upper die shoe 215 and a plurality of ball bushings 221 fixedly mounted on lower die shoe 209. Each post 219 is sized and shaped to project tightly within an associated bushing 221 upon the downward stroke of ram 213 to ensure the proper alignment between upper punch blocks 217 and die blocks 211.

Figure 6:
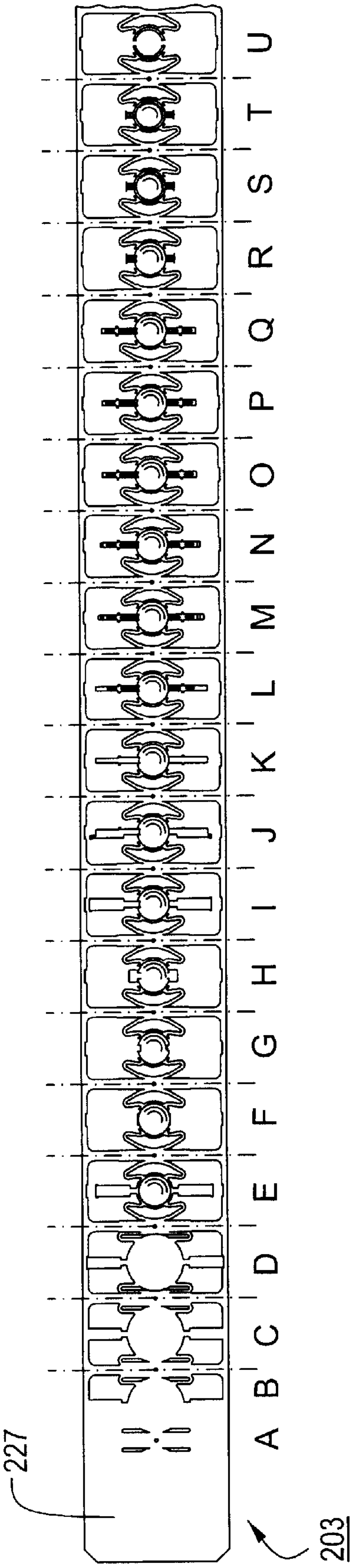
FIG. 6 is a top view of the succession of one-piece bulbshields which are produced in a sheet metal strip as it advances through the plurality of stations in the progressive die press of FIG. 5.
Figure 7:
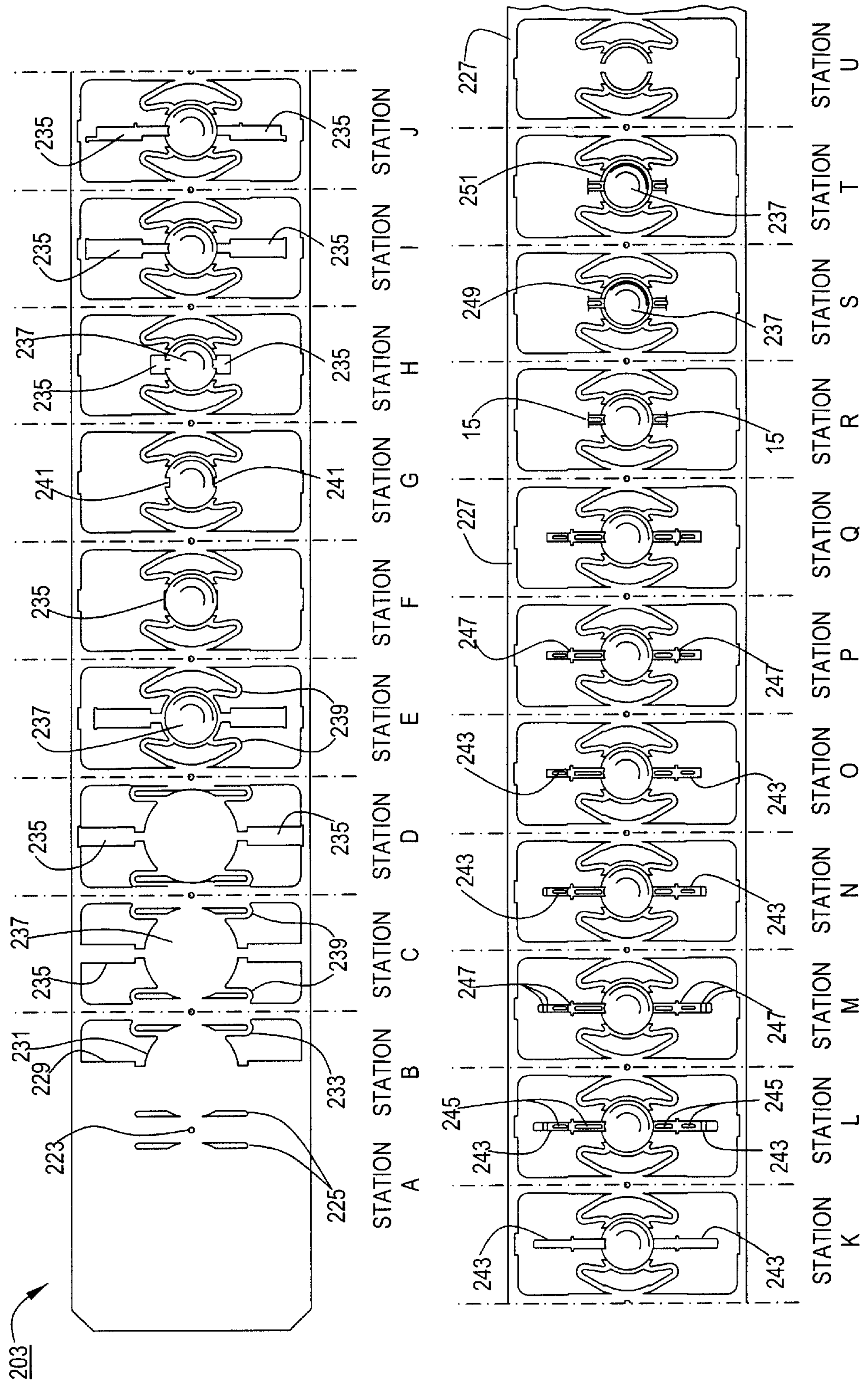
FIG. 7 is an enlarged top view of the succession of one-piece bulbshields produced in a sheet metal strip shown in FIG. 6, the sheet metal strip being shown in two parts for ease of illustration.

As noted above, progressive die press 201 comprises a plurality of operation stations, each station being responsible for performing at least one task in constructing bulbshield 11 from sheet metal strip 203. Referring now to FIGS. 6-7, sheet metal strip 203 is depicted as it is formed at the corresponding stations of progressive die press 201.

At station A of progressive die press 201, sheet metal blank 203 is pierced to create a pilot hole 223. As can be appreciated, pilot hole 223 assists in accurately indexing blank 203 at each station of progressive die press 201. As an additional operation task, at station A of progressive die press 201, sheet metal blank 203 is cut to form four slots 225. As will be described further in detail below, slots 225 form an initial outline of a webbing for connecting bulbshield 11 to the remainder of the blank 203, the remainder of blank 203 being referred to herein as a carrier web 227.

At station B of progressive die press 201, sheet metal blank 203 is cut to form an initial outline of a pair of legs 229, an initial outline of a cup 231 and a continued outline of a webbing 233 for connecting cup 231 to carrier web 227.

At station C of progressive die press 201, sheet metal blank 203 is cut to form a more defined, initial outline of a pair of legs 235, a more defined, initial outline of a cup 237 and the final outline of a stretchable webbing 239 for connecting cup 231 to carrier web 227.

At station D of progressive die press 201, the ends of initial outline of legs 235 are severed from carrier web 227. It should be noted that severing legs 235 from carrier web 227 serves as a preparatory draw step because drawing cup 237 without severing legs 235 from carrier web 227 would unfavorably stretch legs 235.

At station E of progressive die press 201, a primary draw of cup 237 is performed, the drawing operation causing webbing 239 to stretch. Cup 237 is drawn so that the barrel of cup 237 has a generally conical shape and the closed end of cup 237 has a generally spherical shape.

At station F of progressive die press 201, legs 235 are wiped down, or straightened, so as to extend at a right angle relative to carrier web 227. It should be noted that legs 235 are disposed in an upward position in preparation for the side shearing process performed at station G.

At station G of progressive die press 201, side shears 241 are formed into the drawn barrel wall of cup 237. It should be noted that the formation of side shears 241 is required because a portion of the barrel wall of cup 237 will become waste product, as will be described further in detail below.

At station H of progressive die press 201, legs 235 are repositioned, or coined, back into alignment within the barrel wall of cup 237. As an additional operation task, at station H of progressive die press 201, cup 237 is further resized to set its final, conical shape.

At station I of progressive die press 201, legs 235 are folded back down so as to extend generally parallel with carrier web 227. It should be noted that legs 235 are disposed into a flat condition in preparation for the final leg outlining and forming operations to be described further in detail below.

At station J of progressive die press 201, a final outline is performed on one side of legs 235.

At station K of progressive die press 201, a final outline is performed on the other side of legs 235 so as to yield a finished leg outline 243.

At station L of progressive die press 201, a plurality of reinforcement, stiffening ribs 245 are formed into legs 243 for strengthening purposes. As an additional operation task at station L of progressive die press 201, a plurality of preset fold lines 247 are formed into legs 243 for future leg bending operations. Furthermore, as an additional operation task at station L of progressive die press 201, one of legs 243 is embossed with an identification stamp (not shown).

At station M of progressive die press 201, the formation of legs 15 of bulbshield 11 commences. Specifically, the finger of each leg 243 is bent and shaped into its final configuration.

At station N of progressive die press 201, the formation of legs 15 of bulbshield 11 continues. Specifically, the foot of each leg 243 is bent and shaped into an initial configuration.

At station O of progressive die press 201, the formation of legs 15 of bulbshield 11 continues. Specifically, the foot of each leg 243 further bent and shaped.

At station P of progressive die press 201, the formation of legs 15 of bulbshield 11 continues. Specifically, legs 243 are initially bent along fold lines 247.

At station Q of progressive die press 201, the formation of legs 15 of bulbshield 11 continues. Specifically, the foot of each of legs 243 is bent and shaped into its final angular position.

At station R of progressive die press 201, legs 243 are wiped down, or straightened, so as to be disposed at a right angle relative to carrier web 227. As such, legs 243 are outlined and formed into its final configuration to yield finished legs 15 of bulbshield 11.

At station S of progressive die press 201, a primary formation of a bumped shoulder, or swage, 249 is formed into the draen wall entrance of cup 237 in the exact configuration of the defined edge scroll profile of bulbshield 11.

At station T of progressive die press 201, a finalized, sharpened, setting formation of a bumped shoulder, or swage, 251 is formed into the drawn wall entrance of cup 237 to yield finished bulbshield 11.

At station U of progressive die press 201, finished bulbshield 11 is ejected from carrier web 227.

It is to be understood that progressive die press 201 represents one means for performing method 101. It is also to be understood that the present invention is not limited to the particular series of operational stations of progressive die press 201. Rather, the series of operational stations of press 201 could be modified without departing from the spirit of the present invention.

As an example, the number of operating stations for press 201 could be reduced without compromising the ability of the press to perform method 101. Specifically, certain operating stations for press 201 could be eliminated or combined without compromising the ability of the press to perform method 101. However, it should be noted that combining multiple operating stations together could unbalance ram 213 and cause press 201 to overload, which is undesirable.

As another example, the number of operating stations for press 201 could be increased without compromising the ability of the press to perform method 101. Specifically, additional operating stations, such as a bump and carry station in which finished bulbshield 11 is carried to a remote ejection station, could be introduced without compromising the ability of the press to perform method 101.

As another example, the sequence of operating stations for press 201 could be changed without compromising the ability of the press to perform method 101. Specifically, the specific order of the operating stations for press 201 be mixed without compromising the ability of the press to perform method 101.

The embodiment of the present invention described above is intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A method for manufacturing a one-piece bulbshield from a sheet metal strip using a progressive die press, said one-piece bulbshield comprising a cup and a pair of legs, the cup having a defined edge scroll, said method comprising the steps of:

(a) forming a primary outline of the legs and the cup of a bulbshield in the sheet metal strip;

(b) providing a stretchable webbing for connecting the cup of the bulbshield to the remainder of the sheet metal strip;

(c) drawing the primary outline of the cup of the bulbshield, the cup drawn including a barrel having a generally conical shape and a closed end having a generally spherical shape;

(d) forming a final outline of the legs from the primary outline of the legs of the bulbshield;

(e) shaping the final outline of the legs of the bulbshield, the final outline of the legs being shaped so that each leg includes a spring engagement foot which comprises a substantially straight support member and a spring finger disposed to project at an approximate right angle away from the substantially straight member, said shaping the final outline of the legs comprising the steps of:

(i) forming a plurality of preset fold lines in the final outline of the legs, (ii) bending the final outline of the legs along the preset fold lines to form the final configuration of the spring fingers of the bulbshield, and (iii) bending the final outline of the legs along the preset fold lines to form the final configuration of the engagement feet of the bulbshield;

(f) forming the defined edge scroll into the primary outline of the cup of the bulbshield to yield a finished one-piece bulbshield; and (g) severing the finished one-piece bulbshield from the remainder of the sheet metal strip.

2. The method for manufacturing a one-piece bulbshield of claim 1 wherein the step of forming a final outline of the legs from the primary outline of the legs of the bulbshield comprises the steps of:

(a) forming a final outline on one side of the primary outline of the legs, and (b) forming a final outline on the other side of the primary outline of the legs so as to yield the finished leg outline of the legs of the bulbshield.

3. A method for manufacturing a one-piece bulbshield from a sheet metal strip using a progressive die press, said one-piece bulbshield comprising a cup and a pair of legs, the cup having a defined edge scroll, said method comprising the steps of:

(a) forming a primary outline of the legs and the cup of a bulbshield in the sheet metal strip;

(b) drawing the primary outline of the cup of the bulbshield, the cup drawn including a barrel having a generally conical shape and a closed end having a generally spherical shape;

(c) forming a swage into the barrel of the cup;

(d) forming a final outline of the legs from the primary outline of the legs of the bulbshield;

(e) shaping the final outline of the legs of the bulbshield;

(f) forming the defined edge scroll into the primary outline of the bulb of the bulbshield to yield a finished one-piece bulbshield; and (g) severing the finished one-piece bulbshield from the remainder of the sheet metal strip.

4. The method for manufacturing a one-piece bulbshield of claim 3 and further including the step of forming side shears into the barrel of the cup.

5. A method for manufacturing a one-piece bulbshield from a sheet metal strip using a progressive die press, said one-piece bulbshield comprising a cup and a pair of legs, the cup having a defined edge scroll profile, said method comprising the steps of:

(a) forming an initial outline of a webbing for connecting the one piece bulbshield to the remainder of the sheet metal blank, the remainder of the sheet metal blank defining a carrier web, (b) cutting the sheet metal blank to form an initial outline of a pair of legs, an initial outline of a cup and a continued outline of a webbing for connecting the cup to the carrier web, the initial outline of the pair of legs having ends, (c) severing the ends of the initial outline of the pair of legs from the carrier web, (d) drawing a primary outline of the cup so that the cup has a barrel that has a generally conical shape and a closed end that has a generally spherical shape, the barrel of the cup having an entrance, (e) straightening the legs of the one piece bulbshield so that they extend at a right angle relative to the carrier web, (f) forming side shears into the barrel of the cup, (g) repositioning the legs back into alignment within the barrel wall of the cup, (h) folding back the legs so that they extend generally parallel with the carrier, web, (i) forming a final outline of the legs so as to yield a finished leg outline (j) forming a plurality of reinforcement, stiffening ribs into the final outline of the legs and forming a plurality of preset fold lines into the final outline of the legs for use in forming a finger and a foot into each leg, (k) bending each leg to form the finger, (l) bending each leg to form the foot, (m) locking down the legs so that they are disposed at a right angle relative to the carrier web, (n) forming a bumped shoulder into the entrance of the cup of the one piece bulbshield in the exact configuration of the defined edge scroll profile of the one-piece, bulbshield, and (o) ejecting the one-piece bulbshield from the carrier web.

* * * * *